(12) United States Patent
Burkhart (10) Patent No.: US 8,381,889 B2
(45) Date of Patent: Feb. 26, 2013

(54) DUAL CLUTCH

(75) Inventor: Dirk Burkhart, Klingenmuenster (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/344,968

(22) Filed: Jan. 6, 2012

(65) Prior Publication Data

US 2012/0175213 A1 Jul. 12, 2012

Related U.S. Application Data (63) Continuation of application No. PCT/DE2010/000743, filed on Jun. 29, 2010.

(30) Foreign Application Priority Data

Jul. 6, 2009 (DE) .......................... 10 2009 031 798

(51) Int. Cl.
*F16D 25/10* (2006.01)
*F16D 21/06* (2006.01)

(52) U.S. Cl. ........... 192/48.607; 192/48.615; 192/85.48; 192/99 S (58) Field of Classification Search ............. 192/48.601, 192/48.602, 48.607, 48.615, 48.8, 85.48, 192/85.59, 99 S
See application file for complete search history.

(56) References Cited

U.S. PATENT DOCUMENTS 7,124,871 B2 * 10/2006 Friedmann et al. .......... 192/99 S

FOREIGN PATENT DOCUMENTS

| DE | 10 2004 009 832 A1 | 9/2004 |
| DE | 10 2006 019 252 A1 | 10/2007 |
| EP | 1 455 106 A1 | 9/2004 |
| EP | 1524446 A1 | 4/2005 |
| FR | 2 917 795 A1 | 12/2008 |

* cited by examiner

*Primary Examiner* — Richard M. Lorence
(74) *Attorney, Agent, or Firm* — Lucas & Mercanti, LLP; Klaus P. Stoffel (57) ABSTRACT

A dual clutch, which has a first friction clutch pulled by a first lever actuator and a second friction clutch pushed by a second lever actuator. The lever actuators each have a lever that is spring-loaded on one side and lever tips which are moved by a bearing block. The bearing block can be moved radially with along a profile of the lever to set a variable contact point of the lever between a rigid base plate and the lever to act on actuating bearings of the friction clutches. The bearing block is actuated by force application in one of the radial directions of motion by a drive controlled by a control unit in an automated manner. The drive of both lever actuators is formed by a pneumatic controller. In each drive a piston is movable in a housing and is connected to the bearing block by a piston rod.

13 Claims, 5 Drawing Sheets

DUAL CLUTCH

CROSS-REFERENCE TO RELATED APPLICATIONS

This application is a continuation of PCT/DE2010/000743 filed Jun. 29, 2010, which in turn claims the priority of DE 10 2009 031 798.8 filed Jul. 6, 2009. The priority of these applications is hereby claimed and these applications are incorporated by reference herein.

FIELD OF THE INVENTION

The invention relates to a dual clutch, which has a first friction clutch that is pulled by a first lever actuator and a second friction clutch, which is pressed by a second lever actuator.

BACKGROUND OF THE INVENTION

A generic lever actuator is known, for example, from DE 2004 009 832 A1. Here, the lever is clamped in on one side by a compression coil spring and the lever has a longitudinal contouring that is loaded by a radially displaceable bearing block, which is supported on a base plate. This results in a varying fulcrum formed during the displacement of the bearing block and the lever being displaced axially at the lever end which lies opposite the clamped side depending on the position of the bearing block and, depending on the embodiment of the friction clutch as a friction clutch which is pressed closed or pressed open, loads an engagement bearing or disengagement bearing and actuates the friction clutch as a result. Here, the bearing block is displaced radially by an electric drive such as an electric motor via a spindle.

DE 10 2006 019 252 A1 discloses an arrangement of a dual clutch. Here, one friction clutch is positively pulled closed and the other is positively pressed closed. The actuation takes place by a lever actuator. The bearing block of the lever actuator is driven by an electric motor via a spindle drive. Spindle drives of this type can be formed from recirculating ball spindles, obliquely positioned bearings or nuts with spindle threads. Drives of this type are complicated and/or tend to stiffen operation all the way up to jamming. This can, for example, be at cross purposes to safety requirements, according to which, in order to prevent jamming of the mechanism, has to be avoided in applications of a dual clutch in conjunction with a dual clutch transmission.

SUMMARY OF THE INVENTION

In view of the above, the present invention relates a dual clutch, which has lever actuators, where the actuation of the lever actuators can take place by way of low actuating forces and the dual clutch reliably meets the current safety requirements.

Broadly, the present invention is directed to a dual clutch, which has a first friction clutch that is pulled by a first lever actuator and a second friction clutch, which is pressed by a second lever actuator. The lever actuators each have a lever which is spring-loaded on one side and the lever tips of the lever actuators are displaced by means of a bearing block in order to load actuating bearings of the friction clutches. The bearing block can be displaced radially with respect to the rotational axis of the friction clutches along a contouring of the lever and, therefore, sets a variable fulcrum of the lever between a fixed base plate and the lever. The bearing block is actuated in a manner loaded by force at least in one of the radial movement directions by means of a drive, which is controlled in an automated manner by a control unit. The drive of both lever actuators is formed from a fluidic actuating element unit, and the fluid actuating element in one piston, which can be displaced in a fixedly arranged housing, is connected to the bearing block by means of a piston rod. Here, fluidic means pneumatic or hydraulic. It can therefore be a pneumatic actuating device or a fluid-actuated actuating device. Low-loss operation of the lever actuators which is not influenced by the losses in the degree of efficiency of spindle drives and bears the risk of jamming can be proposed by the drive of the linearly displaced bearing block as a result of the linear piston movement of the piston of the fluidic actuating element unit by means of the piston rod. If, for example, a compressed air supply device is available anyway in a vehicle, as is the case, for example, in commercial vehicles, equipping the lever actuators with drives comprising pneumatic actuating element units is of no consequence in terms of cost, since they are simple to produce and simple to actuate via actuating valves. Furthermore, the installation space requirement is to be estimated as being at least neutral in comparison with the use of electric motors as drive.

Here, in the simplest case, an actuating element unit, which is equipped with a piston that is pressure-loaded on one side, can be provided for a lever actuator. The piston is displaced by a pressure, which is varied in a pressure chamber connected to the piston, axially counter to the action of a restoring force. This restoring force can be, for example, the spring which loads the lever of the lever actuator and/or a restoring force of the friction clutch disk spring or lever spring which is loaded by the lever via the actuating bearing.

According to one embodiment, the pneumatic or hydraulic actuating element unit can load the bearing block with a force in both directions and can displace it radially, with the result that the friction clutch can be closed and opened actively or the force-free movement direction can additionally be assisted and/or a self-locking action can be produced and/or the bearing block and, therefore, the friction clutch can be held with regard to its degree of opening at any desired point of the clutch travel. To this end, at least one piston of the actuating element unit of a lever actuator can be arranged such that it can be displaced in a manner loaded axially by force in both radial movement directions by a pressure which is varied in one of two pressure chambers which are connected to in each case one end face of the piston. This means that the piston can be loaded on both sides with pressure of in each case one pressure line. Said pressures can be controlled via a corresponding pneumatic or hydraulic control valve which can in each case connect one or both pressure connections to the pressure supply device, for example a pump and/or a compressed air store/hydraulic medium store.

The use of single-chamber or double-chamber actuating element units of this type, that is to say having a piston which can be loaded on one side or two sides with air pressure/hydraulic pressure, as drives for the two lever drives makes a multiplicity of varying application options possible for connecting a dual clutch. For example, having one pulled and one pressed friction clutch, it is possible for the friction clutch to have a common back pressure plate which has, on both sides, a friction face for one clutch plate which is assigned to a transmission input shaft of a component transmission of a dual clutch transmission, and against the common hack pressure plate the respective pressure plate of the friction clutch, which is pulled closed or pressed closed, is stressed axially by the lever actuators. Here, the lever actuator for actuating the pulled friction clutch according to this embodiment is arranged on the other side of the back pressure plate, with the result that its pressure plate is pulled by means of tie rods which reach around the back pressure plate, so that both lever actuators can be accommodated in a manner which is virtually neutral with respect to installation space in an installation space region of the clutch housing at approximately the same axial height and merely offset over the circumference between the transmission sockets of the dual clutch transmission. It should be mentioned here that the actuating forces are each supported on the transmission housing. The force directions are in opposite directions and the force receptacles of the lever actuators therefore are each arranged in an inverted manner.

In another embodiment, the dual clutch provides that both friction clutches open automatically (normally open) in the case of force-free drive. Here, two pneumatic or hydraulic actuating element units with merely one piston, which can be loaded with pressure (air pressure/hydraulic pressure) on one side, are provided for both friction clutches. The piston is displaced by means of pressure counter to the spring forces for the automatic opening of the friction clutches and closes the respective friction clutch. In the case of a defect of one or both lever actuators, jamming of the dual clutch transmission can be prevented if the other lever actuator is switched in a force-free manner. The closed friction clutches have to be held closed permanently under the application of pressure to the actuating element units.

Contrarily, in another embodiment both friction clutches can be closed or kept closed (normally closed) in the force-free state of their drives. Here, the friction clutches are pressed closed by means of a corresponding design of their lever or disk springs and the friction clutches are opened by the lever actuators and their pneumatic/hydraulic drives counter to the action of the closing forces. To this end, in each case one pneumatic or hydraulic actuating element unit is likewise sufficient for a friction clutch which can be loaded with pressure in a single direction, namely the opening direction of the friction clutch. In this state, the friction clutches can be operated in the closed state without additional energy. In the driving state, however, a friction clutch constantly has to be kept open in a pressure-loaded manner. The safety concept proceeds from a low probability of double faults, with the result that, in the case of the defect of one lever actuator, the second lever actuator can always disengage the friction clutch which is assigned to it and therefore jamming of the dual clutch transmission in the case where both friction clutches transmit torque in the case of a gear being selected in each case in the corresponding part drive train. If there is a double fault, as an alternative at least one gear of a part drive train can be positively disengaged.

Two further embodiments provide for opening the first friction clutch automatically in the force-free state of their drive and closing the second friction clutch in the force-free state of their drive or vice versa. In this connection, in each case, pneumatic or hydraulic actuating element units which have a piston that can be loaded with pressure on one side are likewise sufficient. In the case of a defect of one lever actuator or friction clutch, the positively closed (pressed closed, normally open) friction clutch disengages automatically. If the friction clutch jams, the positively open friction clutch (normally closed) is opened by the pneumatic operation. It has been proven to be advantageous to connect the automatically closing friction clutch (positively pressed open, normally closed) to the part drive train which contains the overdrive. This results in high driving portions that can be driven with a lever actuator system which is not operated with the application of energy since, during the driving state in overdrive, the necessary friction clutch is closed automatically and, therefore, without the supply of energy and the other friction clutch is open automatically, that is to say without the supply of energy.

According to a further embodiment, one or both friction clutches or their associated lever actuators can be self-locking or their movement can be frozen (normally stack) at any travel point of the clutch travel. To this end, the lever actuators of one or both friction clutches are advantageously equipped with a pneumatic or hydraulic actuating element unit. The piston of the actuating element unit can be loaded with pressure on both sides, with the result that, by means of a balanced pressure in both pressure chambers, the piston and, therefore, the bearing block and the lever with the lever tips with the actuating bearing and the lever tips of the lever spring of the relevant friction clutch and, therefore, the degree of transmission of torque via the friction clutch can be self-locking. If, presuming a tight seal, both pressure chambers are isolated from the pressure source, this clutch state is frozen. It goes without saying that each or both friction clutches can be operated in this way, or else merely one friction clutch, whereas the other represents a friction clutch which opens automatically or closes automatically and can be operated in this way by way of a bidirectional actuating element unit or can have only a one-sided actuating element unit. Furthermore, one or both friction clutches, which are operated in this way, can be friction clutches which close or open in the force-free state, or both friction clutches can be provided in a mixed arrangement, one closing automatically and the other opening automatically.

BRIEF DESCRIPTION OF THE DRAWINGS

The invention will be explained in greater detail using the exemplary embodiments shown in FIGS. 1 to 9, in which.

DETAILED DESCRIPTION OF THE INVENTION

Figure 1:
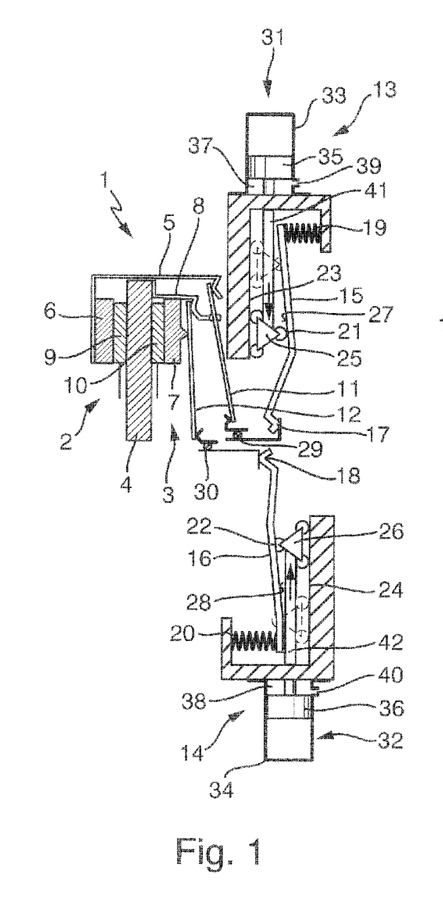
FIG. 1 shows a diagrammatic illustration of a dual clutch having two lever actuators and one pulled friction clutch which is open in the force-free state and one pressed friction clutch which is closed in the force-free state.

A common feature of all the following figures is the embodiment shown in FIG. 1 of the dual clutch 1, which is known as a triple plate clutch. Here, the two friction clutches 2, 3 have the centrally arranged back pressure plate 4 in common. The friction clutch 2 is a friction clutch, which is pulled by means of the tie rod 5 which reaches radially over the back pressure plate 4, and the friction clutch 3 is a pressed friction clutch. The pressure plates 6, 7 can be displaced axially and are received fixedly in terms of rotation by means of leaf springs (not shown) on the housing 8, which is connected fixedly to the back pressure plate 4. In order to close the friction clutches 2, 3, the pressure plates 6, 7 clamp the friction linings of the clutch plates 9, 10 which are connected in a rotationally locking manner to in each case one transmission input shaft of a part drive train of a dual clutch transmission against the back pressure plate 4 in order to form a frictional connection. Depending on the design of the friction clutches 2, 3 as friction clutches which are closed in the force-free state, open or self-locking, the lever springs 11, 12 clamp the friction clutches 2, 3 in different ways.

As an alternative, the present teaching could also be applied to a quadruple plate clutch, as can be gathered, in particular, from EP 1 524 446 B1.

In FIG. 1, the friction clutch 2 is open in the force-free state, that is to say the lever spring 11 does not clamp the pressure plate 6 against the back pressure plate 4 via the tie rod 5 until the friction clutch 2 is pulled closed by the lever actuator 13 for closing, that is to say for forming a frictional connection between the pressure plate 6 and the back pressure plate 4 firstly and the friction linings of the clutch plate 9 secondly, by the lever spring 11 being supported on the housing 8 after a displacement of the lever tips and producing a frictional connection with the clutch plate 9.

In contrast to this, the friction clutch 3 is a friction clutch, which is closed in the force-free state. In the force-free state the lever spring 12 clamps the pressure plate 7 with respect to the housing 8 to form a frictional connection between the back pressure plate 4 and the pressure plate 7 firstly and the friction linings of the clutch plate 10 secondly. The friction clutch 3 is moved up by the lever actuator 14, by the lever tips of the lever spring 12 which is displaced axially.

The lever actuators 13, 14 for the two friction clutches 2, 3 have a lever 15, 16, the lever tips 17, 18 of the lever 15, 16 axially act on the lever tips of the lever springs 11, 12 via the rotational decoupling of the actuating bearings 29, 30 and displace the lever tips 17, 18. The displacement of the lever tips 17, 18 of the levers 15, 16 takes place by single-sided, elastic clamping of the levers 15, 16 by means of the energy stores 19, 20 and the radial displacement of their fulcrums 21, 22 by means of the bearing block 25, 26 along a base plate 23, 24, which is arranged fixedly on the housing. Here, depending on the design of the contouring 27, 28 of the levers 15, 16, a desired displacement of the lever tips for actuating the friction clutches 2, 3 is achieved during a displacement of the bearing blocks 25, 26.

The friction clutch 2 is closed by a contouring 27 which is axially widens radially to the inside if the bearing block 25 is displaced radially to the outside. Here, the lever 15 is supported on the energy store 19 and the changing fulcrum 21, and as a result of which the lever tips 17 press the actuating bearing 29, which is mounted at the lever tips of the lever spring 11 in the direction of the friction clutch 2. As a result, after deflection of the lever spring 11 on the housing 8, the tie rods 5 are actuated by the lever spring 11, and the tie rods 5 pull the pressure plate 6 against the back pressure plate 4 and close the friction clutch 2.

The friction clutch 3 is opened by a contouring 28 which narrows axially radially to the inside with respect to the base plate 24 if the bearing block 26 is displaced radially to the outside. Here, the lever 16 is supported on the energy store 20 elastically and on the changing fulcrum 22 such that during the displacement of the bearing block radially to the outside, the lever tips 18 tilt and move the actuating bearing 30 away from the friction clutch 3 and therefore the prestress of the lever spring 12 for clamping the pressure plate 7 is released, and the friction clutch 3 is disengaged.

The displacement of the bearing blocks 25, 26 of the lever actuators 13, 14 takes place by one pneumatic actuating element unit 31, 32, which is formed from a housing 33, 34 and a piston 35, 36 that can be displaced axially in the housing 33, 34 and form a pressure chamber 37, 38 that has a pressure connection 39, 40 to supply pressure from a pressure supply device, such as a pump and/or pressure accumulator. The pressure is regulated by a control valve (not shown). The piston 35, 36 is connected to the bearing block 25, 26 by a piston rod 41, 42, so that a simple transmission of force is made possible without an additional mechanism or rotational direction converter, which reduces the degree of efficiency, as is necessary, for example, when drive is provided by electric motors. The bearing block, which is shown using dashed lines, represents the closed state for the friction clutch 2 and the open state for the friction clutch 3. Here, the pistons 35, 36 of the actuating element units 31, 32 are displaced axially to the maximum extent by the pressure which is applied in the pressure chambers 37, 38.

In the following figures, components which are similar to the components described in detail in FIG. 1 have the number 100 added to them.

Figure 2:
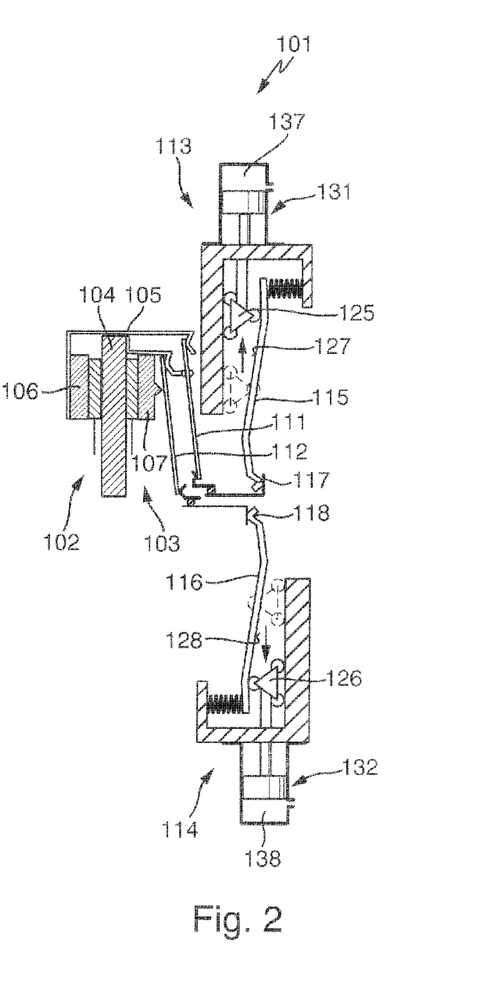
FIG. 2 shows a diagrammatic illustration of a dual clutch having two lever actuators and one pulled friction clutch which is closed in the force-free state and one pressed friction clutch which is open in the force-free state.

In contrast to FIG. 1, FIG. 2 shows the dual clutch 101 in a modified circuit. Here, the friction clutch 102 is a friction clutch which is closed in the force-free state and the friction clutch 103 is a friction clutch which is open in the force-free state. Accordingly, the levers 115, 116 of the lever actuators 113, 114 are equipped with a contouring 127, 128 which narrows radially to the inside or opens radially to the inside, and the bearing blocks 125, 126 are displaced radially to the inside by the actuating element units 131, 132. To this end, the function of the actuating element units 131, 132 is also reversed, with the result that the pressure chambers 137, 138 are situated radially outside the bearing blocks 125, 126.

In the case of a displacement of the bearing block 125 radially to the inside, the lever tips 117 are displaced away from the friction clutch 102, so that the lever spring 111 releases the pressure plate 106 via the tie rod 105 and the frictional connection is canceled. The friction clutch 102 is therefore opened.

In the case of a displacement of the bearing block 126 radially to the inside, the lever tips 118 of the lever 116 are displaced in the direction of the friction clutch 103. The lever spring 112 moves the pressure plate 107 against the back pressure plate 104 and finally clamps it, and the open friction clutch 103 is closed during the displacement of the bearing block 126.

Figure 3:
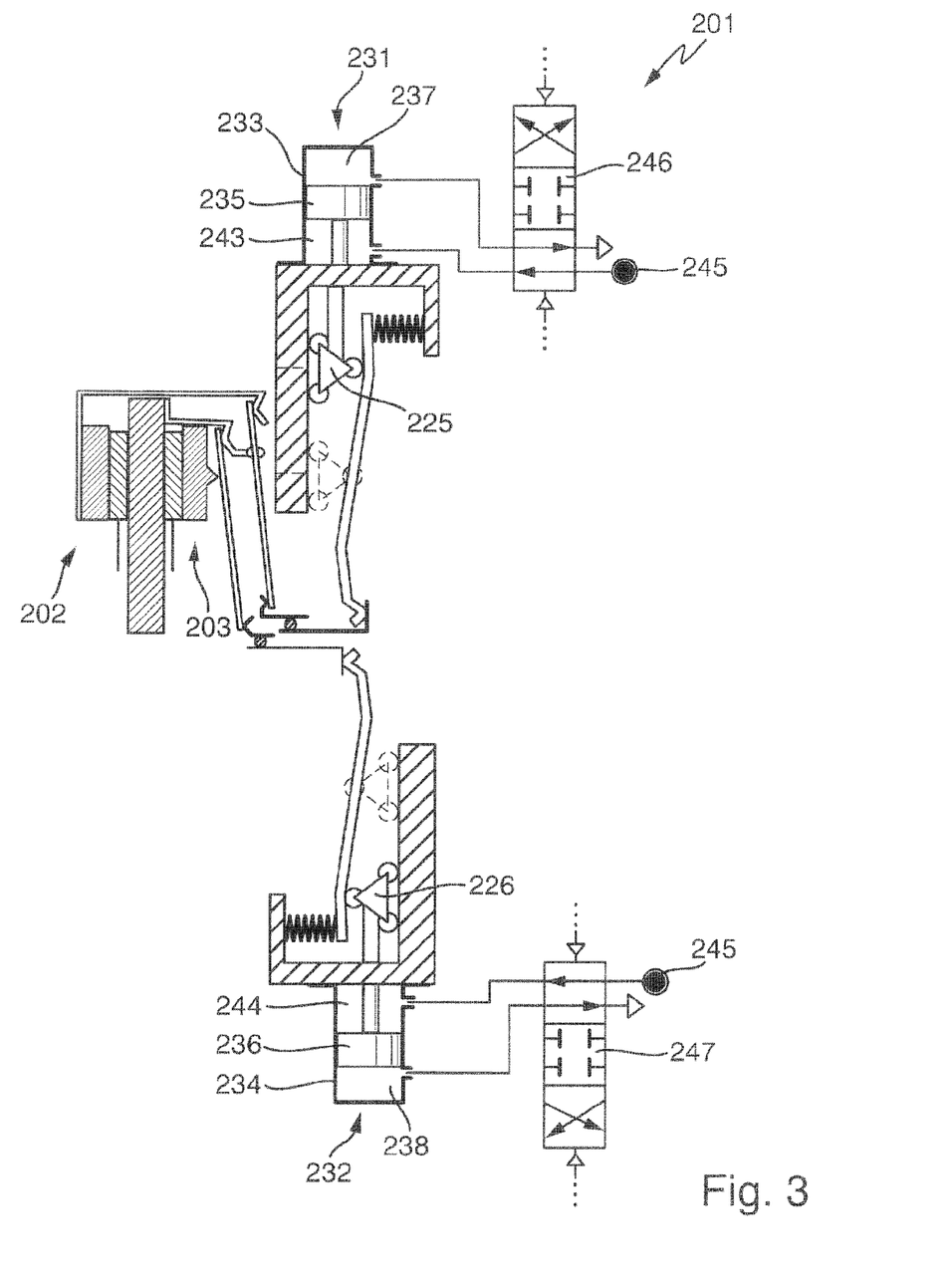
FIG. 3 shows a diagrammatic illustration of a dual clutch having two lever actuators with one pulled and one pressed friction clutch which are in each case self-locking in every position.

FIG. 3 shows the dual clutch 201, which has two self-locking friction clutches 202, 203. In addition, the dual clutch 201 has two actuating element units 231, 232, which can be loaded with pressure (hydraulic pressure or pneumatic pressure) in both displacement directions of the bearing blocks 225, 226. The actuating element units 231, 232 each have a piston 235, 236 which can be displaced axially in the housing 233, 234 and is connected to two pressure chambers 237, 243 and 238, 244, which can be loaded with pressure. The pressure chambers 237, 243 and 238, 244 can be loaded with corresponding pressure by a pressure supply device 245 that can be controlled by a control valve 246 or 247. The piston 235, 236 can be set in every travel position in a self-locking manner by corresponding differential pressures between the two pressure chambers 237, 243 and 238, 244 being set in every position. As a result, the friction clutches 202, 203 can also be set in a self-locking manner at every clutch travel position. A clutch position can therefore be frozen, as it were. It is to be mentioned for the sake of completeness that the friction clutch 202 is closed in the radially outer position of the bearing block 225 and the friction clutch 203 is open in the radially outer position of the bearing block 226. Accordingly, the friction clutch 202 is opened during a displacement of the bearing block 225 radially to the inside, and the friction clutch 203 is closed during a displacement of the bearing block 226 radially to the inside.

Figure 4:
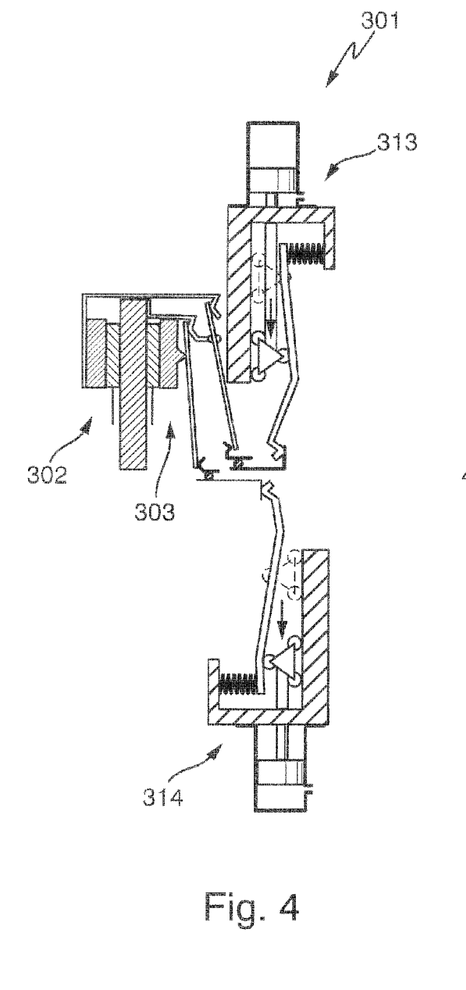
FIG. 4 shows a diagrammatic illustration of a dual clutch having two lever actuators and one pulled and one pressed friction clutch which are in each case open in the force-free state.

FIG. 4 shows the dual clutch 301, which is similar to the dual clutches 1, 101 of FIGS. 1 and 2, with the difference that both friction clutches 302, 303 are open in the force-free state. To this end, the friction clutch 302, which has a lever actuator 313 that correspond substantially to the friction clutch 2 of FIG. 1 that has a lever actuator 13, and the friction clutch 303, which has a lever actuator 314, corresponds substantially to the friction clutch 103 of FIG. 2 that has a lever actuator 114.

Figure 5:
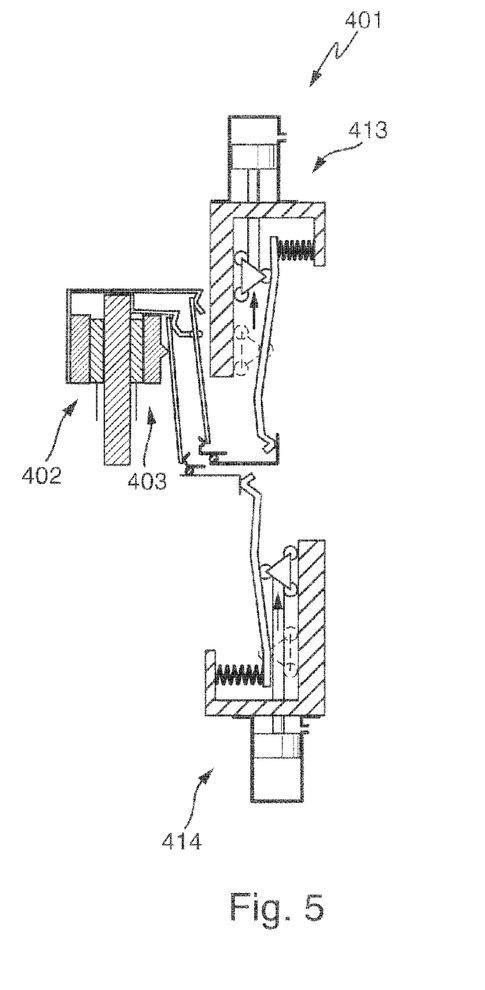
FIG. 5 shows a diagrammatic illustration of a dual clutch having two lever actuators and one pulled and one pressed friction clutch which are in each case closed in the force-free state.

FIG. 5 shows the dual clutch 401, which is similar to the dual clutches 1, 101 of FIGS. 1 and 2, with the difference that both friction clutches 402, 403 are closed in the force-free state. To this end, the friction clutch 402, which has a lever actuator 413, corresponds substantially to the friction clutch 102 of FIG. 2 that has a lever actuator 113, and the friction clutch 403, which has a lever actuator 414, corresponds substantially to the friction clutch 3 of FIG. 1 that has a lever actuator 14

Figure 6:
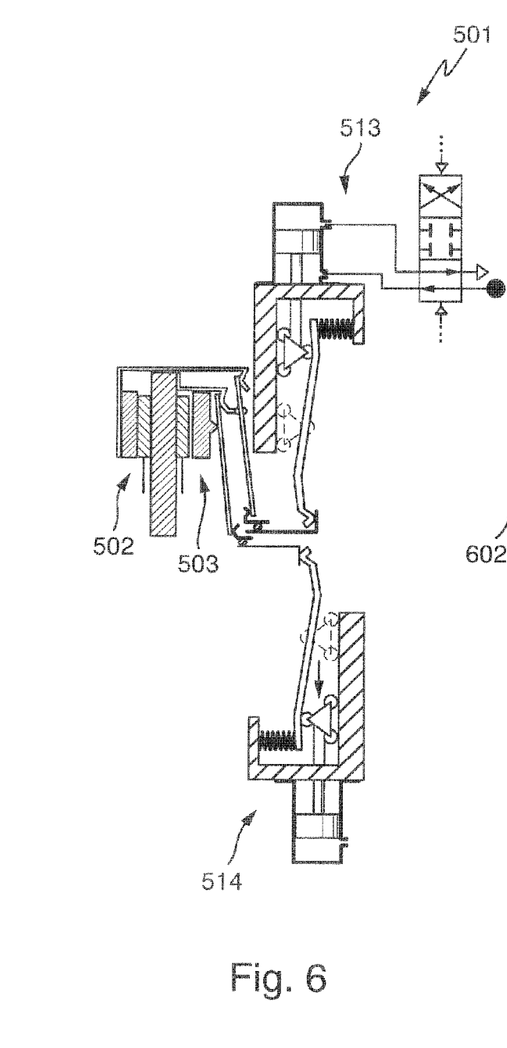
FIG. 6 shows a diagrammatic illustration of a dual clutch having two lever actuators and one self-locking pulled and one pressed friction clutch open in the force-free state.

FIG. 6 shows the dual clutch 501, which is similar to the dual clutches 101, 201 of FIGS. 2 and 3, with the difference that the friction clutch 502 is a self-locking friction clutch and the friction clutch 503 is open in the force-free state. To this end, the friction clutch 502, which has a lever actuator 513, corresponds substantially to the friction clutch 202 of FIG. 3 that has an actuating element unit 231, and the friction clutch 503, which has a lever actuator 514, corresponds substantially to the friction clutch 103 of FIG. 2 that has a lever actuator 114.

Figure 7:
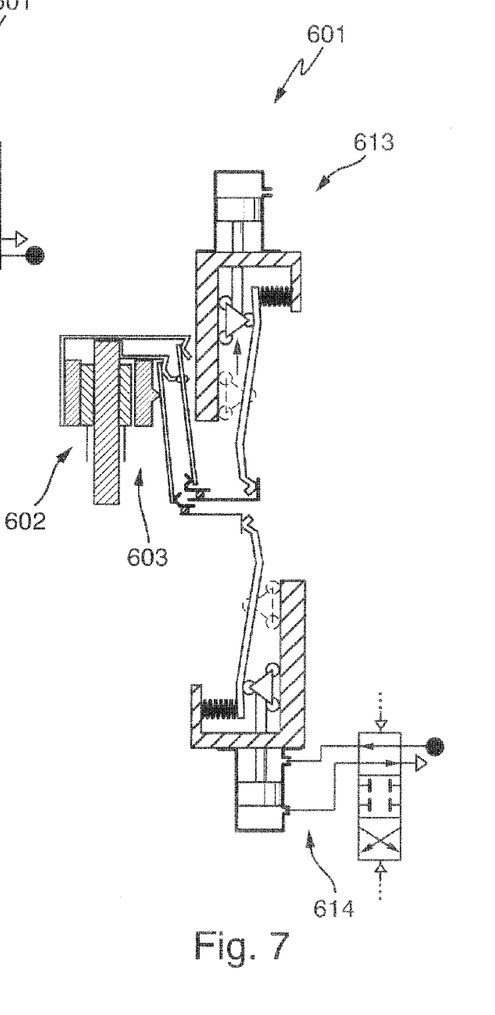
FIG. 7 shows a diagrammatic illustration of a dual clutch having two lever actuators and one pulled friction clutch closed in the force-free state and one self-locking pressed friction clutch.

FIG. 7 shows the dual clutch 601, which is similar to the dual clutches 101, 201 of FIGS. 2 and 3, with the difference that the friction clutch 602 is closed in the force-free state and the friction clutch 603 is a self-locking friction clutch. To this end, the friction clutch 602, which has a lever actuator 613, corresponds substantially to the friction clutch 102 of FIG. 2 that has a lever actuator 113, and the friction clutch 603, which has a lever actuator 614, corresponds substantially to the friction clutch 203 of FIG. 3 that has an actuating element unit 232.

Figures 8, 9:
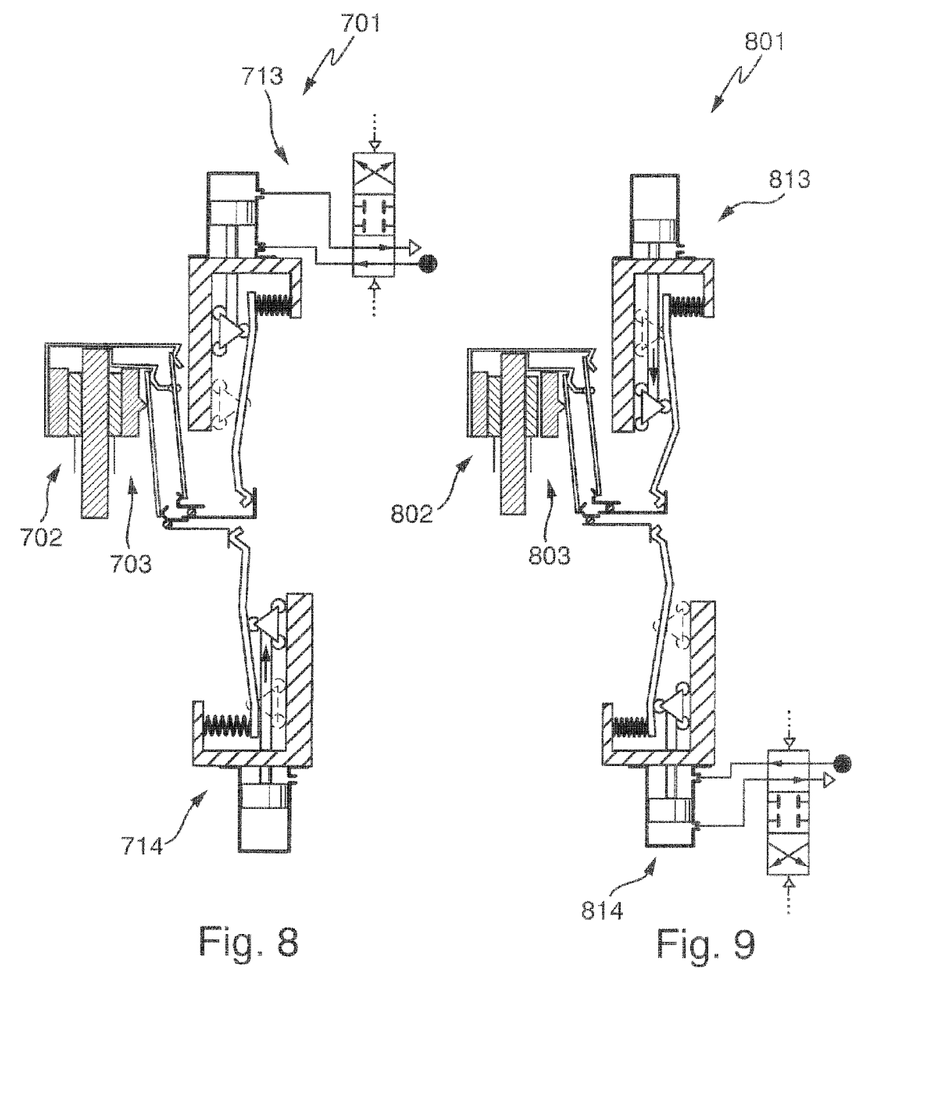
FIG. 8 shows a diagrammatic illustration of a dual clutch having two lever actuators and one self-locking pulled friction clutch and one pressed friction clutch closed in the force-free state.
FIG. 9 shows a diagrammatic illustration of a dual clutch having two lever actuators and one pulled friction clutch open in the force-free state and one self-locking pressed friction clutch.

FIG. 8 shows the dual clutch 701, which is similar to the dual clutches 1, 201 of FIGS. 1 and 3, with the difference that the friction clutch 702 is a self-locking friction clutch and the friction clutch 703 is closed in the force-free state. To this end, the friction clutch 702, which has a lever actuator 713, corresponds substantially to the friction clutch 202 of FIG. 3 that has an actuating element unit 231, and the friction clutch 703 having the lever actuator 714 corresponds substantially to the friction clutch 3 of FIG. 1 that has a lever actuator 14.

FIG. 9 shows the dual clutch 801, which is similar to the dual clutches 1, 201 of FIGS. 1 and 3, with the difference that the friction clutch 802 is open in the force-free state and the friction clutch 803 is a self-locking friction clutch. To this end, the friction clutch 802, which has a lever actuator 813 corresponds substantially to the friction clutch 2 of FIG. 1 that has a lever actuator 13, and the friction clutch 803, which has a lever actuator 814, corresponds substantially to the friction clutch 203 of FIG. 3 that has an actuating element 232.

LIST OF DESIGNATIONS

1 Dual Clutch
2 Friction Clutch
3 Friction Clutch
4 Back Pressure Plate
5 Tie Rod
6 Pressure Plate
7 Pressure Plate
8 Housing
9 Clutch Plate
10 Clutch Plate
11 Lever Spring
12 Lever Spring
13 Lever Actuator
14 Lever Actuator
15 Lever
16 Lever
17 Lever Tip
18 Lever Tip
19 Energy Store
20 Energy Store
21 Fulcrum
22 Fulcrum
23 Base Plate
24 Base Plate
25 Bearing Block
26 Bearing Block
27 Contouring
28 Contouring
29 Actuating Bearing
30 Actuating Bearing
31 Actuating Element Unit
32 Actuating Element Unit
33 Housing
34 Housing
35 Piston
36 Piston
37 Pressure Chamber
38 Pressure Chamber
39 Pressure Connection
40 Pressure Connection
41 Piston Rod
42 Piston Rod
101 Dual Clutch
102 Friction Clutch
103 Friction. Clutch
104 Back Pressure Late
105 Tie Rod
106 Pressure Plate
107 Pressure Plate
111 Lever Spring
112 Lever Spring
113 Lever Actuator
114 Lever Actuator 115 Lever
116 Lever
117 Lever Tip
118 Lever Tip
125 Bearing Block
126 Bearing Block
127 Contouring
128 Contouring
131 Actuating Element Unit
132 Actuating Element Unit
137 Pressure Chamber
138 Pressure Chamber
201 Dual Clutch
202 Friction Clutch
203 Friction Clutch
225 Bearing Block
226 Bearing Block
2311 Actuating Element Unit
232 Actuating Element Unit
233 Housing
234 Housing
235 Piston
236 Piston
237 Pressure Chamber
238 Pressure Chamber
243 Pressure Chamber
244 Pressure Chamber
245 Pressure Supply Device
246 Control Valve
247 Control Valve
301 Dual Clutch
302 Friction Clutch
303 Friction Clutch
313 Lever Actuator
314 Lever Actuator
401 Dual Clutch
402 Friction Clutch
403 Friction Clutch
413 Lever Actuator
414 Lever Actuator
501 Dual Clutch
502 Friction Clutch
503 Friction Clutch
513 Lever Actuator
514 Lever Actuator
601 Dual Clutch
602 Friction Clutch
603 Friction Clutch
613 Lever Actuator
614 Lever Actuator
701 Dual Clutch
702 Friction Clutch
703 Friction Clutch
713 Lever Actuator
714 Lever Actuator
801 Dual Clutch
802 Friction Clutch
803 Friction Clutch
813 Lever Actuator
814 Lever Actuator

The invention claimed is:

1. A dual clutch, comprising:
a first friction clutch having a first actuating bearing;
a first lever actuator, which pulls the first friction clutch, having first drive, which is controlled in an automated manner by a first control unit and formed from a fluidic actuating element unit that has a fixedly arranged first housing and a first piston displaceably arranged in the first housing, a first fixed base plate arranged fixedly on the first housing, a first bearing block, a first variable fulcrum, and a first lever that is spring-loaded on one side, the first piston is connected to the first bearing block by a first piston rod, the first lever has a first contouring and a first lever tip, the first lever tip is displaced by the first bearing block to load the actuating bearing of the first friction clutch, the first bearing block being radially displaceable with respect to a rotational axis of the first friction clutch along the first contouring of the first lever so as to set the first variable fulcrum between the first base plate and the first lever and the first bearing block is actuated in a manner loaded by a force at least in one radial movement direction by the first drive;
a second friction clutch having a second actuating bearing; and
a second lever actuator, which presses the second friction clutch, having second drive, which is controlled in an automated manner by a second control unit and formed from a fluidic actuating element unit that has a fixedly arranged second housing and a second piston displaceably arranged in the second housing, a second fixed base plate arranged fixedly on the second housing, a second bearing block, a second variable fulcrum, and a second lever that is spring-loaded on one side, the second piston is connected to the second bearing block by a second piston rod, the second lever has a second contouring and a second lever tip, the second lever tip is displaced by the second bearing block to load the actuating bearing of the second friction clutch, the second bearing block being radially displaceable with respect to a rotational axis of the second friction clutch along the second contouring of the second lever so as to set the second variable fulcrum between the second base plate and the second lever and the second bearing block is actuated in a manner loaded by a force at least in one radial movement direction by the second drive.

2. The dual clutch as claimed in claim 1, wherein at least one of the pistons of the lever actuators is displaced on one side by a pressure which is varied in a pressure chamber which is connected to the at least one of the pistons, axially counter to an action of a restoring force.

3. The dual clutch as claimed in claim 1, wherein at least one of the pistons of the lever actuators can be displaced in a manner loaded axially by force in both radial movement directions by a pressure which is varied in one of two pressure chambers which are each connected to one end face of the at least one of the pistons.

4. The dual clutch as claimed in claim 3, wherein the lever actuators of both of the friction clutches are operated in a self-locking manner by a balanced pressure in both of the pressure chambers.

5. The dual clutch as claimed in claim 3, wherein the first friction clutch opens automatically in a force-free state of the first drive and the second lever actuator of the second friction clutch is operated in a self-locking manner by a balanced pressure in both of the pressure chambers.

6. The dual clutch as claimed in claim 3, wherein the first lever actuator of the first friction clutch is operated in a self-locking manner by a balanced pressure in both of the pressure chambers and the second friction clutch opens automatically in a force-free state of the second drive.

7. The dual clutch as claimed in claim 3, wherein the first lever actuator of the first friction clutch is operated in a self-locking manner by a balanced pressure in both of the pressure chambers and the second friction clutch is closed in a force-free state of the second drive.

8. The dual clutch as claimed in claim 3, wherein the first friction clutch is closed in a force-free state of the first drive and the second lever actuator of the second friction clutch is operated in a self-locking manner by a balanced pressure in both of the pressure chambers.

9. The dual clutch as claimed in claim 1, wherein, the first contouring and the second contouring have an angle of inclination so that at least one of the friction clutches is opened automatically in a case of force-free drive.

10. The dual clutch as claimed in claim 1 wherein both of the friction clutches open automatically in case of force-free drive.

11. The dual clutch as claimed in claim 1, wherein both of the friction clutches are closed in a force-free state of the drives.

12. The dual clutch as claimed in claim 1, wherein the first friction clutch opens automatically in a force-free state of the first drive and the second friction clutch is closed in a force-free state of the second drive.

13. The dual clutch as claimed in claim 1, wherein the first friction clutch is closed in a force-free state of the first drive and the second friction clutch opens automatically in a force-free state of the second drive.

* * * * *